No. 639,212. Patented Dec. 19, 1899.
H. P. CHILDRESS.
HUB SECURING DEVICE FOR VEHICLES.
(Application filed Oct. 2, 1899.)
(No Model.)
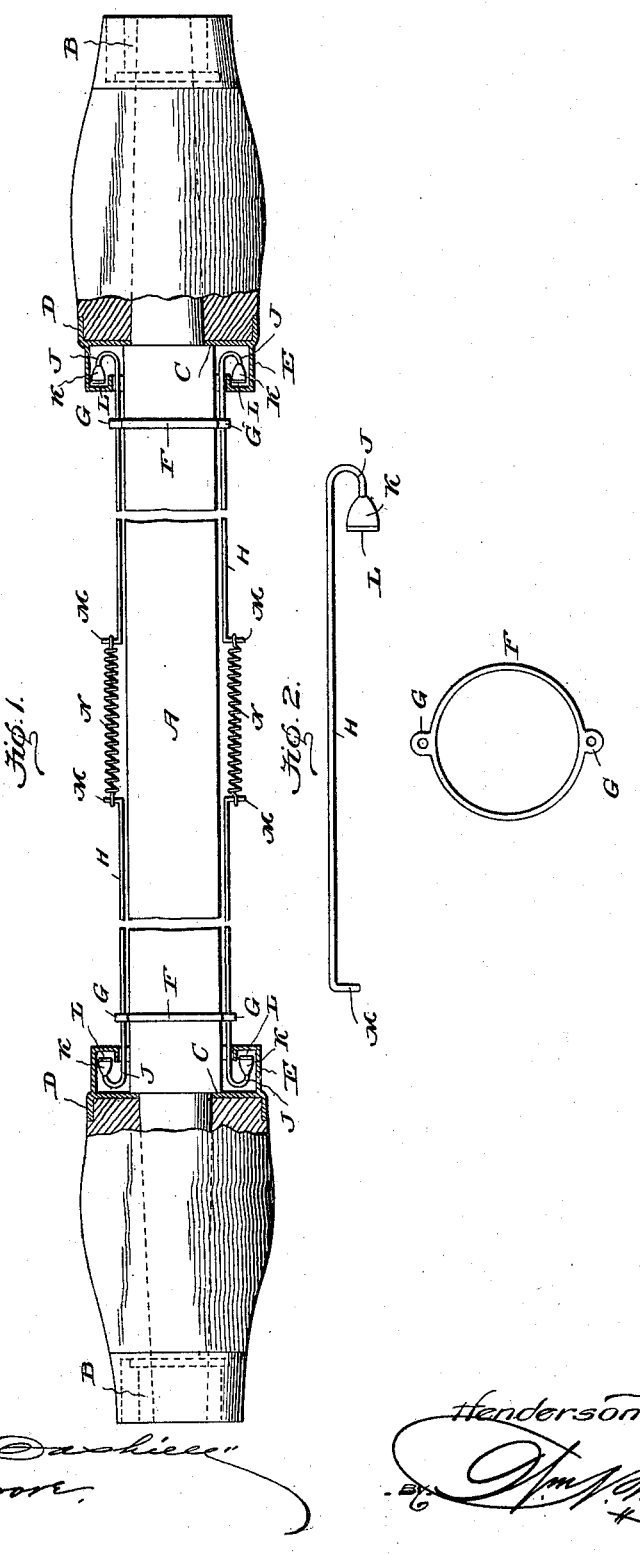
Witnesses:
Inventor
Henderson P. Childress

UNITED STATES PATENT OFFICE.

HENDERSON PIRCE CHILDRESS, OF MEMPHIS, TENNESSEE.

HUB-SECURING DEVICE FOR VEHICLES.

SPECIFICATION forming part of Letters Patent No. 639,212, dated December 19, 1899.

Application filed October 2, 1899. Serial No. 732,311. (No model.)

*To all whom it may concern:*

Be it known that I, HENDERSON PIRCE CHILDRESS, a citizen of the United States, residing at Memphis, in the county of Shelby and State of Tennessee, have invented certain new and useful Improvements in Hub-Securing Devices, of which the following is a specification.

My invention relates to improvements in vehicles—that is, a hub and a means to prevent the same from sliding off the axle when the nut has accidentally become detached from the axle.

The object of my invention is the provision of a device of this character which is so arranged as not to interfere with the running qualities of the wheels, which is easily applied and detached to the hub and axle, and which is the embodiment of simplicity, durability, and cheapness, thus producing a very useful and practical device.

To attain the desired objects, the invention consists of a device of this character and for the purpose named embodying novel features of construction and combination of parts, substantially as disclosed herein.

In the drawings, Figure 1 is a side elevation of an axle with hubs placed thereon in section, my invention being applied to the axle and hubs; and Fig. 2 is a detail view of the parts detached.

Referring to the drawings, A designates an axle of a vehicle, which carries the hubs B, abutting against the shoulders C, all of these features being of ordinary construction.

Secured upon the inner ends of the hubs are the bands D, which are provided with the projecting flanged rims E.

Surrounding the axle near the ends are the bands or rings F, which are provided with the eyes or loops G, through which pass and are held the rods H, which are provided with the curved ends J, which terminate in the heads K, which have the ferrules or buffer-caps L, formed upon the outer surfaces, the curved ends and heads of the rods being adapted to occupy the space between the projecting rims E, and the rods are provided with the lugs or projections M, which are connected to the springs N secured to the axle at the center thereof, the springs and rods being the means for preventing the wheel-hub from leaving the axle when the nut has become detached, as the flanged rims are contacted by the heads of the rods, which, by reason of the rods and springs, prevents the hub from leaving the axle.

From this description the construction and operation of my invention is readily understood; but the operation, briefly stated, is as follows: When the nut is removed from the axle, the hub will slide until the rods and their springs arrest the movement thereof, and when it is desired to lubricate the axle the rods are released from the springs and the hub can then be removed from the axle.

Thus it will be seen that I provide a very simple, durable, and cheap device of this character which is very efficient and practical.

I claim—

1. In combination with an axle and hub of a vehicle, of a device for preventing the hub from leaving the axle consisting of a flanged band secured to the hub, and spring-controlled rods movably secured to the axle and said flanged band to hold the hub upon the axle, said rods having their ends bent to engage the springs and to engage the band.

2. In combination with an axle and hubs thereof, of a device for holding the hubs thereon, consisting of a band having a flanged rim carried by the hubs, and spring-controlled rods having curved ends to engage the flange of the rim secured movably upon said axle and also having curved ends to engage the springs.

3. In combination with an axle, of a hub fitting upon one end thereof, a flanged band or rim secured to the inner end of said hub, rods arranged in pairs movably secured to the axle and provided with curved outer ends to fit between the flange of the band and the hub, and springs connected to the inner ends of each pair of the rods to exert a tension to prevent the hub from leaving the axle.

4. In combination with an axle, of wheel-hubs carried upon the ends thereof, and means connected to the axle and hubs to prevent the hubs from accidentally leaving the axle, said means consisting of rods arranged in pairs and guided by bands secured upon the axle, said rods having bent ends to engage the wheel-hubs and having their inner ends bent and 5 springs adapted to engage the inner ends of said rods, one spring engaging one pair of rods.

In testimony whereof I affix my signature in presence of two witnesses.

HENDERSON PIRCE CHILDRESS.

Witnesses:
 EMANUEL WOLFF,
 WM. C. SCHWALMEYER.